United States Patent
Serizawa et al.

(10) Patent No.: US 6,844,681 B2
(45) Date of Patent: Jan. 18, 2005

(54) VEHICLE LIGHT APPARATUS

(75) Inventors: Tomoaki Serizawa, Shizuoka (JP);
Kimiaki Ishikawa, Shizuoka (JP);
Tadayuki Okuda, Shizuoka (JP);
Masayasu Ito, Shizuoka (JP);
Taketoshi Fujigaya, Shizuoka (JP);
Michio Arai, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/452,062

(22) Filed: Jun. 2, 2003

(65) Prior Publication Data

US 2003/0227257 A1 Dec. 11, 2003

(30) Foreign Application Priority Data

Jun. 5, 2002 (JP) .................................... P.2002-164280

(51) Int. Cl.⁷ ................................................ B60Q 1/00
(52) U.S. Cl. ...................................... 315/77; 307/10.8
(58) Field of Search ............................. 315/77, 80, 82; 307/10.1, 10.6, 10.8; 362/800

(56) References Cited

U.S. PATENT DOCUMENTS 5,661,645 A * 8/1997 Hochstein ................... 363/89
5,896,084 A * 4/1999 Weiss et al. ................. 340/468
6,396,466 B1 5/2002 Pross et al. .................. 345/82

FOREIGN PATENT DOCUMENTS

JP 04-159147 * 6/1992

* cited by examiner

*Primary Examiner*—Thuy Vinh Tran
(74) *Attorney, Agent, or Firm*—Fish & Richardson P.C.

(57) ABSTRACT

A vehicle light apparatus includes: a power consuming portion provided in parallel with a group of light emitting elements for causing a total power value including power consumed by the lamp to become a normal power value, a breakage detecting portion for detecting a breakage with respect to the group of light emitting elements, and a control portion for controlling power supply to the group of light emitting elements, wherein in the event that a breakage of the group of light emitting elements is detected by the breakage detecting portion, a power supply to the lamp including the group of broken light emitting elements is stopped or power supplied to the lamp is reduced by the control portion. By providing the power consuming portion, the load characteristic can be made constant, and power consumption can be reduced when a breakage of the light emitting element is detected.

7 Claims, 8 Drawing Sheets

VEHICLE LIGHT APPARATUS

BACKGROUND OF THE INVENTION

The present invention relates to a technique for detecting breakage of light emitting elements and controlling power feeding to light emitting elements.

A turn signal lamp is raised as an automobile lamp which repeatedly flashes at predetermined flashing intervals, and the regulation requires that a breakage of the lamp needs to be detected so that the operating conditions of the lamp can easily be noticed the driver of a vehicle. For example, a function of detecting a breakage of a incandescent lamp is incorporated in a relay flasher circuit (a flasher circuit), and in this breakage detecting function, a reduction in the value of current flowing to an incandescent lamp is used to determine whether or not there exists a breakage.

Incidentally, as a light source other than incandescent lamps, lamps using light emitting elements such as LEDs (light emitting diodes) have been in demand from viewpoints of making lamps thinner or smaller in height and reducing power consumption, or due to needs deriving from the design of vehicles. Then, when light emitting elements are used, since the consumed current and current-voltage characteristics of light emitting elements are different from those of incandescent lamps, a flasher circuit having a breakage detecting function needs to be designed newly.

However, the types and numbers of light emitting elements to be used depend on lamps, and therefore, there are caused problems that in case flashers are newly designed depending on lamps, components control and maintenance become complicated and troublesome, and costs are increased in the case of small-volume production.

SUMMARY OF THE INVENTION

Then, the invention was made to provide an vehicle light apparatus utilizing light emitting elements which can commonize a circuit configuration and lower costs.

According to the invention, there is provided an vehicle light apparatus comprising a plurality of lamps each including a group of light emitting elements, the vehicle light apparatus comprising a power consuming means provided in parallel with the group of light emitting elements for causing a total power value including power consumed by the lamp to become a normal power value, a breakage detecting means for detecting a breakage with respect to the group of light emitting elements, and a control means for controlling power supply to the group of light emitting elements, wherein when an instruction signal is inputted into the lamp, the group of light emitting elements are caused to illuminate or flash, and when a breakage of the group of light emitting elements is detected by the breakage detecting means, a power supply to the lamp including the group of broken light emitting elements is stopped or power supplied to the lamp is reduced by the control means.

Consequently, according to the invention, the load characteristics of the lighting apparatus can be made constant by the power consuming means for causing the total power value including the power consumed by the lamp to become a normal power value, and in the event that a breakage of the group of light emitting elements is detected, the power supply to the lamp including the group of broken light emitting elements is stopped or power supplied to the lamp is reduced. Thus, the power consumption is reduced.

DETAILED DESCRIPTION OF THE DRAWINGS

The invention relates to an vehicle light apparatus comprising a plurality of lamps each including a group of light emitting elements such as light emitting diodes and can be applied to turn signal lamps, tail lamps and stop lamps.

Figure 1:
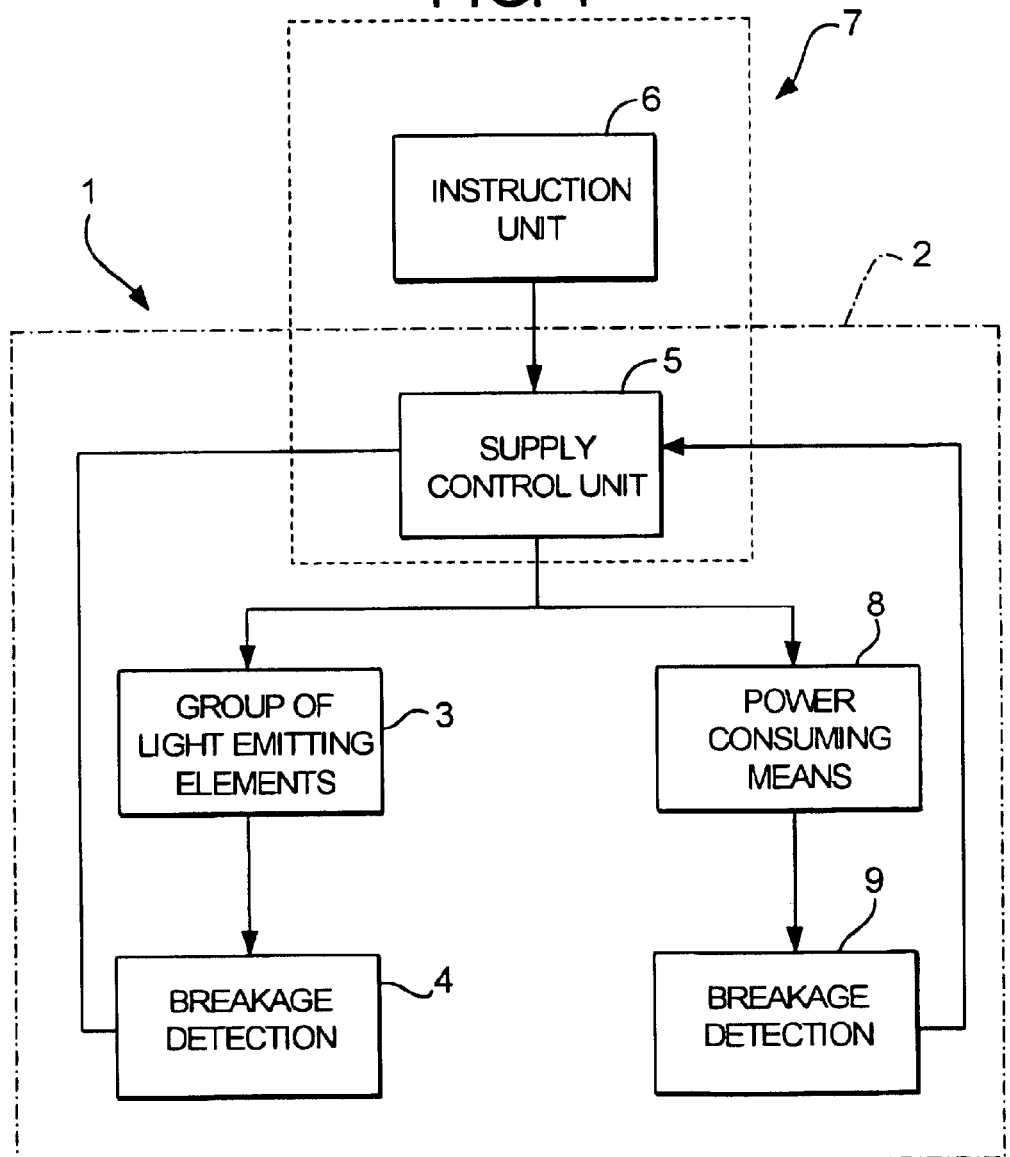
FIG. 1 is an explanatory diagram showing a basic configuration of an vehicle light apparatus according to the invention.

FIG. 1 shows the basic configuration of a lighting system according to the invention.

In an vehicle light apparatus 1, a group of light emitting elements 3 and a breakage detecting means 4 for detecting a breakage on the group of light emitting elements 3 are provided in a lamp (or a lamp unit) 2.

The breakage detecting means 4 is provided, when a breakage of the group of light emitting elements is detected, to stop a power supply to a lamp including the group of light emitting elements on which the detection was detected or to reduce the power supply to the lamp by sending a signal to a (power) supply control unit 5. Note that as methods for detecting such a breakage, there are raised methods; a method for determining a breakage by detecting a reduction in luminous intensity of the group of light emitting elements below a predetermined reference value based on a current value, a method for determining a breakage of a group of light emitting elements by determining from a current value of the group of light emitting elements that the group of light emitting elements cannot be illuminated due to a breakage taking place in part of the group of the light emitting elements, or a method comprising a combination of these two methods.

An instructing unit 6 constitutes together with the supply control unit 5 a control means 7 for controlling power supply to the group of light emitting elements. When an instruction signal for a lamp is inputted into the lamp 2 from the instructing unit 6, feeding is implemented to the group of light emitting elements 3 via the supply control unit 5, so that the light emitting elements illuminate or flash. Note that while a relay or a semiconductor switch element can be raised as an interrupting switch means, either of them can be used.

A power consuming means 8, which is provided in parallel with the group of light emitting elements 3, is additionally provided in order to cause a total power value including the power consumed by the lamp to become a normal value (a power value identical to that of an incandescent lamp) and can take, for example, any of the following forms.

(I) Dummy load circuit
(II) Lamp light source such as an incandescent bulb
(III) Blower or cooling apparatus
(IV) Heat source such as a heater.

Firstly, the dummy load circuit (I) is intended to allow power to be consumed by resistors or active elements, and for example, a ladder-type circuit using resistor elements and a circuit imitating the current-voltage characteristics of an incandescent bulb using transistors are raised as the dummy load circuit.

Assuming that a flasher relay for a bulb of 12V and 21 W is used for a turn signal lamp, when the group of light emitting elements consumes of the order of 13 W, a power corresponding to 8 W may have to be borne by the dummy load circuit. Note that while the embodiment is suitable for reducing costs, power is consumed by dummy resistors which are heated. However, there should be no practical problem with the application to turn signal lamps, since the illumination time is limited.

The form (II) is a form in which a lamp other than the light emitting elements is additionally provided, and a lamp light source (such as an incandescent bulb) may be used which has a wattage which can compensate for surplus power. This form takes a configuration comprising a combination of light emitting elements and an incandescent bulb and can, therefore, enhance the degree of freedom in design.

In addition, in the form (III), for example, a cooling fan or a cooling element is used to compensate for surplus power, and the light emitting efficiency of the light emitting elements can be improved.

As to the form (IV), a heat source such as a heater can be installed in the vicinity of a lens of the lamp so as to prevent the occurrence of a snow damage or a drawback associated with the condensation. In other words, heat produced by a resistant heat generating unit can be used positively.

Note that in the forms (II) to (IV), as shown in FIG. 1, a breakage detecting means 9 is preferably provided for the power consuming means 8, and feeding to the power consuming means 8 may be stopped by a signal sent to the supply control unit 5 when the breakage detecting means detects a breakage.

While feeding to the group of light emitting elements 3 and the power consuming means 8 is implemented from the instructing unit 6 via the supply control unit, in the event that a breakage of a group of light emitting elements is detected by the breakage detecting means 4, a power supply to a lamp including the group of affected light emitting elements is stopped or supplied power to the lamp is reduced by the control means 7. For example, feeding to the group of light emitting elements in the affected lamp is interrupted by a signal sent from the breakage detecting means 4 to the supply control unit 5. In addition, as to lamps including a group of light emitting elements on which no breakage is detected, the group of light emitting elements is caused to flash at shorter flashing intervals than flashing intervals used before the breakage was detected by a signal sent from the instructing unit 6 to the relevant lamps. Namely, as to the lamp including the light emitting elements on which the breakage was detected, since the supply control unit 5 functions relative to the affected lamp, the instructing unit 6 detects that a state in which current does not flow (a similar state to a broken state) is produced in the lamp and causes the other lamps (including pilot lamps) to flash at shorter flashing intervals so that the driver can be warned against the breakage.

Figure 2:
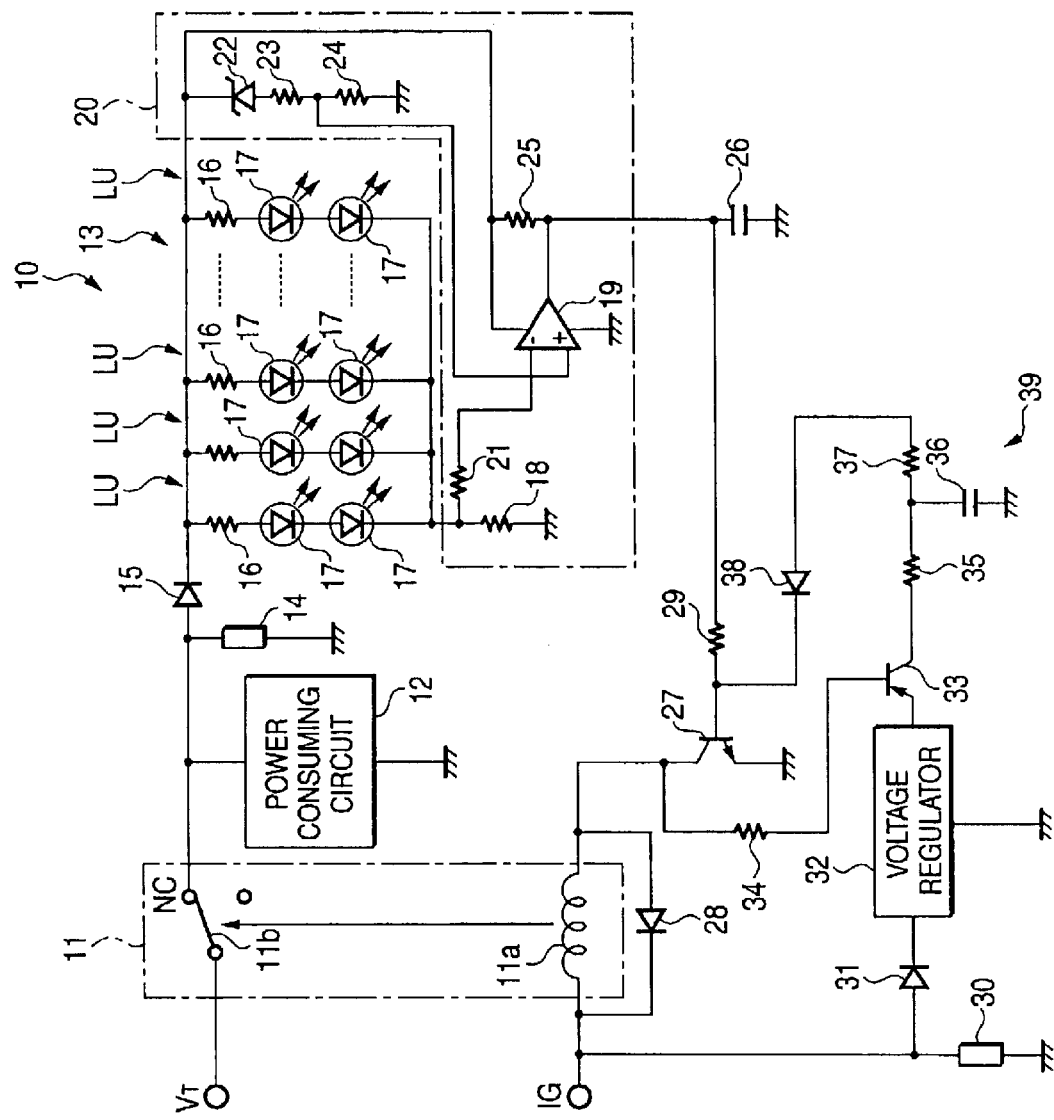
FIG. 2 is a circuit diagram showing a main part of a configuration example of the vehicle light apparatus according to the invention.

FIG. 2 shows an example of circuit configuration 10, and in the figure, "VT" denotes a turn signal input signal from a flasher circuit, not shown, and "IG" denotes an ignition voltage (an input voltage for activating the circuit when the ignition key is operated to switch on the ignition).

In this example, a relay 11 is used as an interrupting switch means which constitutes the supply control unit 5, and VT inputted from a flashing instructing circuit (flasher circuit), not shown, is supplied to a power consuming circuit 12 and a light emitting unit 13 (corresponding to the group of light emitting elements) via a contact (refer to a transfer contact 11b) on an NC (normally closed) side.

The power consuming circuit 12 takes the form (I) and is required in this example in order to use a flasher (instruction) circuit which is specified to an incandescent bulb. Namely, since a flasher circuit specified to an incandescent bulb cannot be used, as it is, for a lamp using light emitting elements having a different current-power characteristic from that of the incandescent bulb, the additional provision of this circuit can imitate a circuit which has a similar load characteristic to that of the incandescent bulb when it comes to the flasher circuit. While a circuit configuration in which a plurality of passive elements such as resistor elements maybe used for this circuit, in order to an approximate characteristic to the current-voltage characteristic of the incandescent bulb, as will be described later on, the circuit may preferably be configured using a plurality of active elements (such as power transistors).

A varistor 14 and a diode 15 are provided posterior to the power consuming circuit 12, and one end of the varistor 14 and an anode of the diode 15 are connected to an NC side contact of the relay 11, and the other end of the varistor 14 is grounded. Then, feeding is implemented from a cathode of the diode 15 to the light emitting unit 13.

The light emitting unit 13 is provided with a circuit, as a unit construction, in which a current limiting resistor and a plurality of light emitting elements are connected in series. For example, a construction in which a current limiting resistor 16 and N (denoting a certain number) light emitting elements 17, 17, . . . are connected in series is regarded as one unit (hereinafter, referred to as a "light emitting unit" and written as "LU"), and by using a circuit in which M (denoting a certain number) units are arranged in parallel, a total of N×M light emitting elements can be illuminated.

As a matter of conveniences, while FIG. 2 only shows the configuration for a single lamp, as is known, there are (in total) four turn signal lamps which are disposed in the vicinity of left front, right front, left rear and right rear corners of the vehicle, and any of the lamps has the same configuration (this is true with a configuration which will be described later on). In addition, in this example, a light emitting diode (LED) is used as the light emitting element, and a circuit configuration is provided in which respective light emitting units LU each containing two LEDs are connected in parallel with one another. In other words, of the two LEDs constituting each light emitting unit LU, one end of the one LEBroken to the cathode of the diode 15 via the current limiting resistor 16, and the other end of the LEBroken to a current detecting resistor 18 via another LED.

The current detecting resistor 18 is provided to detect a total of current (a total current value) flowing to each light emitting unit LU, and one end of the resistor is connected to a cathode of the LED positioned on a lower potential side of each light emitting unit LU, and the other thereof is grounded.

Note that the current detecting resistor 18 constitutes together with a comparator 19 a current detecting unit 20 (constituting the breakage detecting means 4), a connecting point between the current detecting resistor 18 and each light emitting unit is connected to a negative input terminal of the comparator 19 via a resistor 21.

A predetermined reference voltage is supplied to a positive input terminal of the comparator 19, and in this example, a Zener diode 22 and voltage-dividing resistors 23, 24 are used. Namely, a cathode of the Zener diode 22 is connected to the cathode of the diode 15, and an anode of the Zener diode 22 is grounded via the voltage-dividing resistors 23 and 24, a connecting node between the resistor 23 and the resistor 24 being connected to the positive input terminal of the comparator 19.

A pull-up resistor 25 is additionally connected to an output terminal of the comparator 19 and is grounded via a capacitor 26.

An NPN transistor 27 is provided for driving the relay 11, and a collector of the transistor is connected to a coil 11a of the relay 11. Note that an ignition voltage IG is supplied to the coil 11a and that a reverse voltage preventing diode 28 is connected to the coil 11a in parallel.

A base of the NPN transistor 27, which is emitter groundebroken via a resistor 29 to the output terminal of the comparator 19 and one end of the capacitor 26.

The ignition voltage IG is supplied to a varistor 30 and is inputted into a voltage regulator 32 via a forward diode 31. In addition, for example, a three-terminal regulator is used for the voltage regulator 32, and an output voltage of the voltage regulator 32 is supplied to an emitter of a PNP transistor 33.

A base of the transistor 33 is connected to the collector of the transistor 27 via a resistor 34. In addition, a collector of the transistor 33 is connected to one end (a terminal which is not at a grounded end) of a capacitor 36 via resistor 36, and a connecting point where the resistor 35 and the capacitor 36 are connected to each other is connected to the base of the transistor 27 via a resistor 37 and a forward diode 38. Note that this constitutes a hold unit 39 for a H (high) level signal outputted by the comparator 19.

In the case of a lamp utilizing LEDs, while breakage and secular change (aged deterioration) are raised as causes for reduction in luminous intensity, when a "breakage" which is used when the detection of breakage is discussed is defined by, for example, a fact that "the luminous intensity has decreased to or below 50% of an initial value," a reduction in luminous intensity due to aged deterioration needs to taken into consideration. For example, assuming that the life of the vehicle is of the order of 15 years, when taking into consideration a ratio of luminous intensity reduction of an LED (a reduction in luminous intensity of "α" % from the initial value which is regarded as 100%) due to aged deterioration, instead of the "50%" of the initial value, a reduction of "50%/(100−α)"% may be used as a determination criterion. In other words, a breakage may be determined at the point where the luminous intensity of the lamp lowers below this determination criterion.

In this example, the determination criterion corresponds to a reference value of current which corresponds to a value resulting when the luminous intensity of the light emitting unit 13 decreases to the "50%/(100−α)"% of its initial luminous intensity or a reference value which is set slightly higher in view of a safety margin. In the event that a detected value by the current detecting resistor 18 is less than the reference value, the output signal of the comparator 19 becomes the H level and the signal is retained. For example, assuming that the α value is 18%, in a case where a breakage of groups of LEDs of 3 or more circuits (3 or more units) out of M (=8) circuits, since a case becomes a reference in which 5 circuits out of 8 circuits are normal, a current reference value may be set which corresponds to 62.5% (=(5/8)×100).

In addition, to briefly describe the function of the circuit shown in FIG. 2, in the event that the luminous intensity of the whole light emitting units LU is equal to or larger than a predetermined reference value, since a detected level of the total current value of the LEDs which flows to the current detecting resistor 18 is equal to or larger than a reference value for a total current value, the output signal of the comparator 19 is an L (low) level. Consequently, since the transistors 27 and 33 are in an OFF state and the contact of the relay 11 is kept closed (on the NC side), feeding to the light emitting units LU is implemented (the light emitting elements flash by following a flashing instruction at predetermined intervals by VT). In addition, in the event that the luminous intensity of the light emitting units LU becomes lower than the predetermined reference value, since a detection level of the total current value of the LEDs which flows to the current detecting resistor 18 is lower than the reference value for the total current value, the transistor 27 is switched on by the H level signal outputted by the comparator 19, and this state is retained when the transistor 36 is switched on. Consequently, since the contact of the relay 11 is opened (is shifted to an open side) and the feeding path to the luminous units LU is cut off, the light emitting elements 17, 17, . . . are all turned off. The state in which the contact of the relay 11 is opened is equal to the state in which the lamp itself is broken, and therefore, as is known, the flashing circuit (the flasher circuit), not shown, functions, and a flashing instruction signal which instructs a flashing at shorter intervals than a normal case (a case where no breakage is detected) is sent, whereby a high-speed flashing operation (a warning against breakage) is performed on the lamps other than those on which the breakage was detected.

Thus, preferably, a broken state is detected from the number of broken light emitting elements or the fact that breakages are detected over a number of light emitting units which number is equal to or larger than the predetermined number, and the power supply to the lamps including the light emitting elements on which the breakage is determined is stopped. In addition, in the event that a breakage is detected on a relatively small number of light emitting elements, unless the breakages largely affects the luminous intensity of the lamp, the supply of power to the affected lamp continues to be implemented to an extreme extent so that the lamp can function properly, thereby making it possible to ensure the safety on the road.

In a case where the power consuming circuit 12 is configured so as to have a load characteristic similar to that of the incandescent bulb even when the circuit is used in a lamp using LEDs, in the event that the power consuming circuit 12 is configured as, for example, a dummy load circuit using a resistor, there may be caused a problem that the characteristic thereof deviates from a current-voltage characteristic prescribed by the standard for incandescent bulbs.

Figure 3:
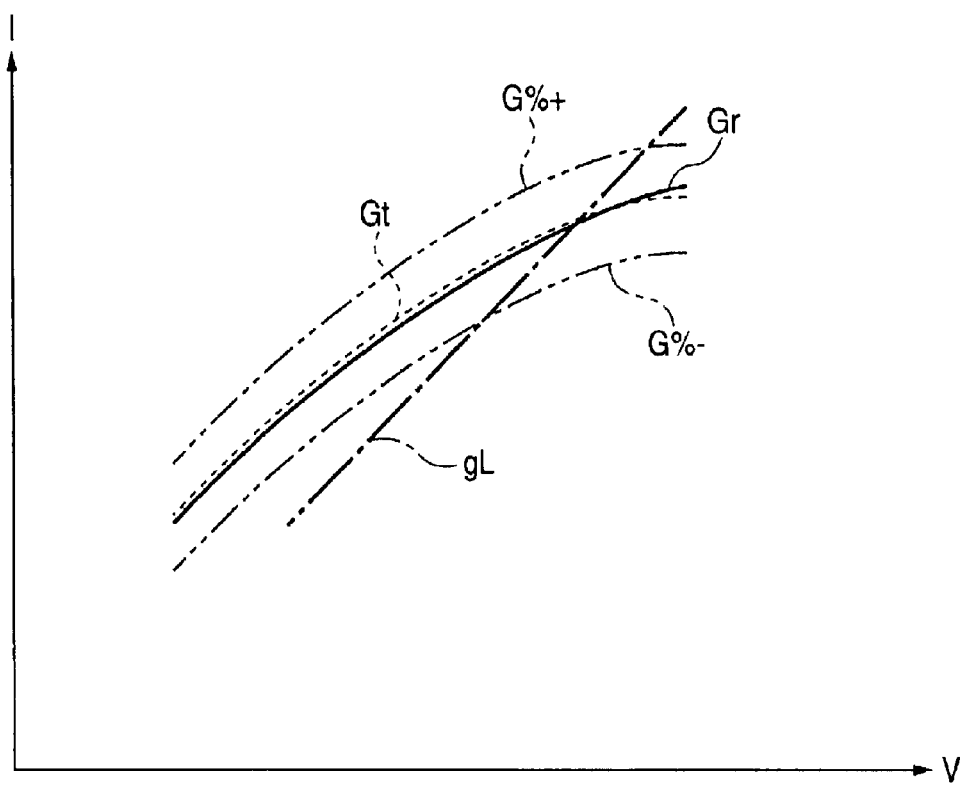
FIG. 3 is an explanatory diagram for explaining a power consuming means in cooperation with FIG. 4, showing a schematic graph in which current-voltage characteristics are depicted.

FIG. 3 shows a schematic illustration of a characteristic associated with the power consuming circuit using a graph showing graph curves, in which graph voltage V is indicated by an axis of abscissa and current I by an axis of ordinate.

In the graph, a graph curve Gt shows an approximate curve (in reality, a polygonal line) representing the standard of incandescent bulbs, a graph curve "G%+" represents an upper permissible limit from GT which serves a reference (this graph curve being such as to result when Gt is parallel shifted in the positive direction along the I axis at a predetermined ratio, for example, by a set width of 10%), and a graph curve "G%−" of the bulb represents a lower permissible limit from Gt which is the reference (this graph curve being such as to result when Gt is parallel shifted in the negative direction along the I axis at a predetermined ratio, for example, by a set width of 10%).

A graph line "gL" represents a comparison example of a characteristic of the power consuming circuit in the event that the circuit is configured only using resistor elements. In this case, since the graph line becomes a straight line having a certain inclination, it is difficult to obtain a characteristic having a shape like what Gt has.

To cope with this, in the power consuming circuit 12, a characteristic indicated by a graph curve Gr can be located within a range having the graph curve G%+ as the upper permissible limit and the graph curve G%− as the lower permissible limit by making use of the current-voltage characteristic (the saturation characteristic of a collector current Ic relative to an emitter-collector voltage VCE) of a transistor, and a characteristic approximate to the graph curve Gt can be obtained by setting circuit parameters and element constants as required.

Figure 4:
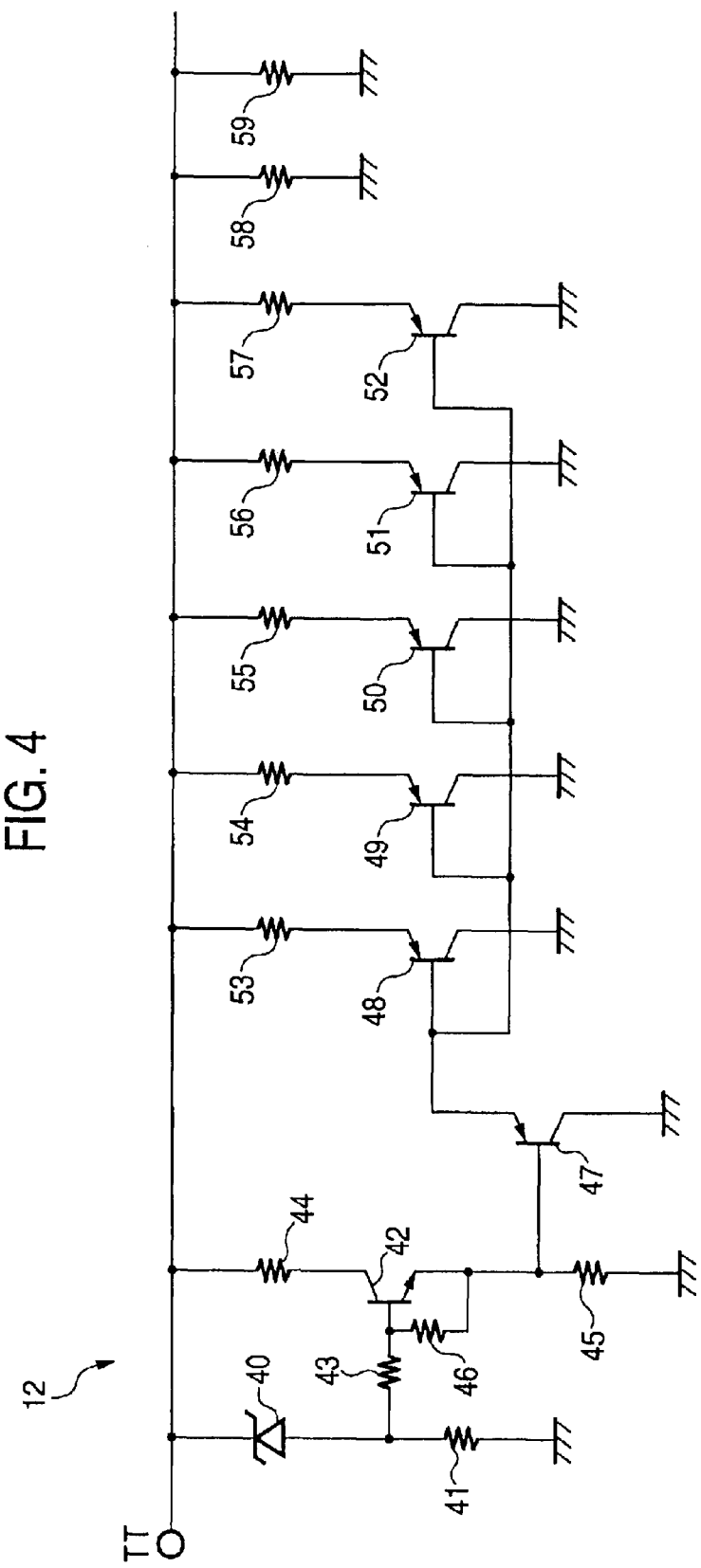
FIG. 4 is a diagram showing a configuration example.

FIG. 4 shows an example of the configuration of the power consuming circuit 12.

A terminal TT is a connecting terminal that is connected to a line connecting an NC contact of the relay 11 in FIG. 2 with the diode 15, and an anode of a Zener diode 40 is connected to the connecting terminal, and a cathode of the Zener diode 40 is grounded via a resistor 41.

Since an NPN transistor 42, which is an emitter follower, is connected at a base thereof to the anode of the Zener diode 40 via a resistor 43, a base potential is made constant. Then, a collector of the transistor 42 is connected to the terminal TT via a resistor 44, and an emitter thereof is grounded via resistor 45. Note that a resistor 46 is interposed between the base and the emitter of the transistor 46.

A PNP transistor 47, which is an emitter follower, is connected at an emitter thereof to bases of PNP transistors 48 to 52, and a base of the transistor 47 is connected to the emitter of the transistor 42.

Power transistors are used for the PNP transistors 48 to 52, and the respective transistors are configured such that collectors of the respective transistors are grounded, while emitters thereof are connected to the terminal TT via their own resistors, thus the respective resistors being in a positional relationship in which they are connected in parallel with one another. Namely, resistors 53 to 57 (having different resistance values) are connected to the emitters of the transistors 48 to 52, respectively. Note that resistors 58, 59 are both provided in parallel with the resistors 53 to 57, and one end of each resistor is connected to the terminal TT and the other end thereof is grounded.

In this circuit, only with the resistors 58, 59 being provided, only a characteristic is provided that as power supplied to the terminal TT increases, current increases linearly. Then, since the Ic-VCE characteristic of the transistor is represented by a saturation curve, a characteristic is combined that as the supply voltage to the terminal TT increases and the voltage between the collector and the emitter or the collector-emitter voltage becomes larger, collector current flowing to the respective transistors 48 to 52 increases a curved fashion to gradually approximate to a certain value, whereby an approximate characteristic as represented by the graph curve Gr shown in FIG. 3 can be obtained.

Consequently, even in the lamp using a group of light emitting elements as a light source, an illumination circuit or flashing circuit for incandescent bulbs can be used, and moreover, in the event that a breakage of the light emitting elements is detected, power supply to the group of light emitting elements is cut off to thereby produce an approximate broken condition (in case a breakage is detected only on the individual light emitting elements, since there exists only a minute change in current value between prior and posterior to the breakage, a condition in which the entirety of the lamp were broken is produced by cutting off the power supply to the group of light emitting elements), whereby a proper breakage detecting function can be ensured.

In addition, in the event that thermal influences cannot be ignored which would be imposed on peripheral components due to large heat values of the transistors 48 to 52, a construction should preferably be adopted in which the entirety of a case for the power consuming circuit 12 is formed from, for example, a synthetic resin, a cover for the case is then formed of a material (such as aluminum) having a high heat conductivity, and heat dissipating fins and heat sinks are integrally formed on the cover (part of the cover is bent in a U-like shape so as to be brought into contact with the transistors so that heat from the transistors is conducted from the contact surface).

Figure 5:
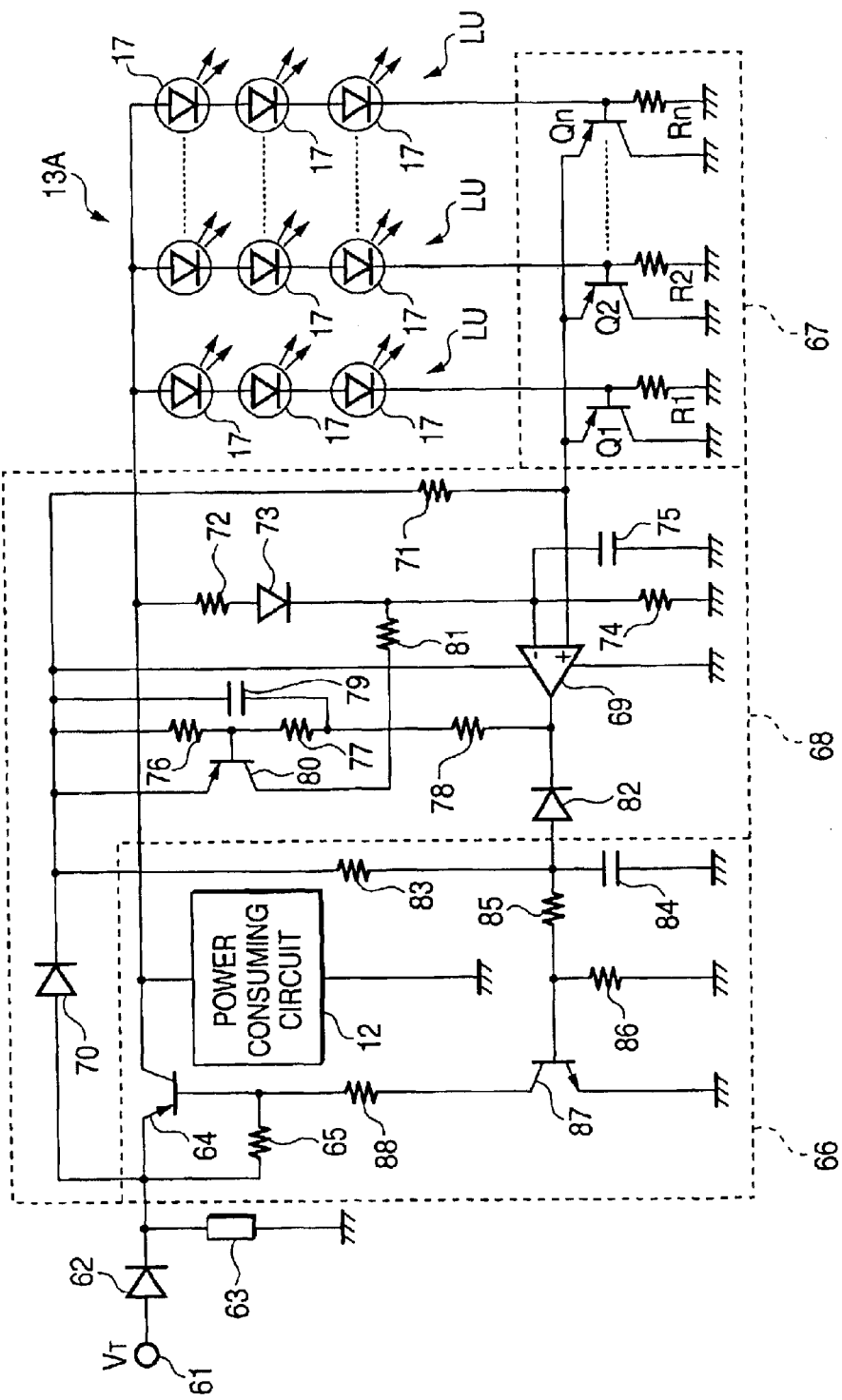
FIG. 5 is a circuit diagram showing a main part of another configuration example of the vehicle light apparatus according to the invention.

FIG. 5 shows another example of circuit configuration 60 according to the invention.

A signal VT is supplied from a terminal 61, and the terminal is connected to an anode of a diode 62. Then, a cathode of the diode 62 is connected to one end of a varistor 63 and an emitter of a PNP transistor 64. In addition, a resistor 65 is interposed between a base and the emitter of the transistor 64, and the base of the transistor 64 is connected to an NPN transistor (87) which constitutes together with the transistor 64 a current supply control unit 66, the NPN transistor being described later on.

The collector voltage of the transistor 64 is supplied to the power consuming circuit 12 and a light emitting unit 13A.

A plurality of light emitting elements 17, 17, . . . (3 LEDs in this example) are connected in series in a single light emitting unit LU, which constitutes a unit construction, and a number of such light emitting units are connected to the light emitting unit 13A in parallel with one another.

PNP transistors Qi (i=1, 2, . . . , n) and current detecting resistors Ri (i=1, 2, . . . , n) constitute a current detecting unit 67 which is related to the respective light emitting units LU, and the numbers of the transistors and resistors are made to be identical to that of the light emitting units LU which constitute the light emitting unit 13A. In other words, the respective current detecting resistors Ri are connected in series to the respective light emitting units LU and to bases of the respective transistors Qi. The other ends (opposite terminals to ends connected to the light emitting units) of the respective current detecting resistors Ri are grounded. Collectors of the respective transistors Qi are all grounded, and emitters thereof are connected not only to each other but also to a positive input terminal of a comparator 69 which constitutes a holding unit 68.

A series circuit includes a resistor 72, a diode 73 and a resistor 74, and one end of the resistor 72 is connected to a collector of the transistor 64, and the other end of the resistor 72 is connected to one end of the resistor 74 and a negative input terminal of the comparator 69 via the forward diode 73. Then, one end (an opposite terminal to the connecting point with the diode 73) of the resistor 74 is grounded, and a capacitor 75 is connected to the resistor 74 in parallel.

A power supply terminal of the comparator 69 is connected to a cathode of the diode 70 for power supply thereto.

A circuit including resistors 76, 77, 78 and a capacitor 79, and a PNP transistor 80 is provided at an output stage of the comparator 69, and the resistors 76, 77, 78 are connected to each other in series. Namely, one end of the resistor 76 is connected to the cathode of the diode 70, and the other end of the resistor 76 is connected to an output terminal of the comparator 69 via the resistors 77, 78. An emitter of the transistor 80 is then connected to the cathode of the diode 70, and a base of the transistor 80 is connected to a connecting point between the resistor 76 and the resistor 77. A collector of the transistor 80 is connected to a negative input terminal of the comparator 69 via a resistor 81.

A cathode of a diode 82 is connected to the output terminal of the comparator 69, and an anode thereof is connected to a connecting point of a resistor 83 with a capacitor 84. Note that the resistor 83 and the capacitor 84 are constitute the current supply control unit 66, and one end of the resistor 83 is connected to the cathode of the diode 70, the other end of the resistor being grounded via the capacitor 84.

Resistors 85, 86 are provided. One of the resistor 85 is connected to an anode of a diode 82, and the other end of the resistor 85 is connected to one end of the resistor and a base of an NPN transistor 87. Note that the other end (a terminal that is not connected to the resistor 85) of the resistor 85 is grounded.

A collector of the transistor 87, which is grounded at an emitter thereof, is connected to the base of the transistor 64 via a resistor 88.

In this example, no rely is used but the transistor 64 is used so that no contact is used, thereby making it possible to attempt to increase the reliability, reduce costs and save the space. In addition, the holding unit 68 is provided not only to detect a breakage on each light emitting unit but also to forcibly turn off one or some of the light emitting units in case it or they are broken, and the remaining lamps with light emitting elements on which no breakage is detected are caused to flash at faster flashing intervals by means of the flasher circuit (not shown), whereby the driver is notified of the occurrence of breakage.

Note that in the event that only one of the light emitting units is broken, it is difficult to understand the occurrence of breakage from the appearance, and therefore, this example can effectively be applied to such a lamp that is difficult to be visibly determined at a glance that a breakage is taking place therein (due to the arrangement of the light emitting units and the manner in which they are illuminated).

To briefly describe the function of the circuit that has been described heretofore, in the event that no breakage is taking place on the light emitting elements 17, 17, . . . which constitute the light emitting unit 13A, the respective transistors Qi (i=1, 2, . . . ) are in the OFF state, and the output signal from the comparator 69 is at the H level. Thus, the transistors 87, 64 are in the ON state, and feeding is implemented to the respective light emitting units of the light emitting unit 13A. In addition, in the event that due to a breakage of a certain light emitting element, the light emitting unit including the broken light emitting element is turned off, the transistor Qi (i denotes any of 1 to n) is in the ON state, and the output signal of the comparator 69 is at the L level. Then, the transistor 80 is put in the ON state, and the potential (reference potential) of the negative input terminal of the comparator 19 is increased, whereby the L level state is maintained in the comparator 69. Thus, the transistors 87, 64 are put in the OFF state, and feeding to the light emitting unit 13A is stopped.

As has been described above, in the event that a breakage is detected on at least one of the light emitting elements, when the mode is adopted in which the power supply to the lamp including the affected light emitting element is stopped, the breakage can be found at an early timing, and a countermeasure such as repair can be implemented without any delay.

In the respective examples that have been described above, while the configurations and modes are described in which in the event that a breakage is detected on a certain light emitting element, the power supply to the lamp including the affected light emitting element is stopped, referring to a circuit configuration example 89 shown in FIG. 6, a configuration and mode will be described in which as soon as a breakage is detected on a certain light emitting element, the power supply to a lamp including the affected light emitting element is reduced.

A signal VT is supplied to the power consuming circuit 12 and a light emitting unit 13B from a contact (refer to a transfer contact 93b in the figure) located on an side which is not an NO (normally open) side of the relay 93 via a parallel circuit from a terminal 90 to a varistor 91 and a capacitor 92.

In the light emitting unit 13B, a light emitting unit LU in which a current limiting resistor 94 and a diode 95 are connected with light emitting elements 17, 17 (in this example, 2 LEDs) is used as a unit construction, and a number of light emitting units are connected in parallel with one another.

A PNP transistor Qi (i=1, 2, . . . , n) is provided not only to detect a breakage on each corresponding light emitting unit but also to open the contact of the relay 93 (or shift it to the NO side) in the event that a breakage is detected on the light emitting units. Note that the number of PNP transistors is made to be identical to the number of light emitting units that constitute the light emitting unit 13B and that the respective transistors are connected in series. Namely, an emitter of the PNP transistor Q1 located at a most superior position is connected to the terminal 90, and a collector of the same transistor is connected to an emitter of a transistor Q2 (not shown) located at a position inferior thereto. Similarly, an emitter of a transistor Qi located at an ith position from the transistor Q1 is connected to a collector of a transistor Qi+1. Then, a collector of a transistor Qn located at a most inferior position is connected to one of a coil 93a of the relay 93.

A base of each transistor Qi is connected to a connecting point between the diode 95 and the light emitting element 17 in each light emitting unit LU via a connecting point between a resistor 96 and a forward diode 97 which are connected to the base of the transistor Qi. Note that a resistor 98 is interposed between the base and emitter of each transistor Qi.

A reverse voltage preventing diode 99 is connected in parallel to the coil 93a of the relay 93, and a terminal of the coil 93a which is located on an opposite end to an end connected to a collector of a transistor Qn is grounded via a forward diode 100.

The function of the circuit according to the example will be described. Firstly, in the event that no breakage is detected on the light emitting elements constituting any of the light emitting units LU, ON/OFF states of all the transistors Qi (i=1, 2, . . . , n) and open/close state of the contact of the relay 93 are in a synchronized relationship with the signal VT. Namely, since the contact of the relay 93 is opened in synchronism with the level of the turn signal input signal VT, the light emitting elements flash. In addition, when a certain light emitting element is broken and the light emitting unit including the broken light emitting element is turned off, the transistor Qi (i denotes any of 1 to n) corresponding to the affected unit is put in the OFF state, whereby the contact of the relay 93 is opened (or shifted to the NO side), and all the light emitting elements are turned off or the luminous intensity thereof is largely reduced.

Figure 6:
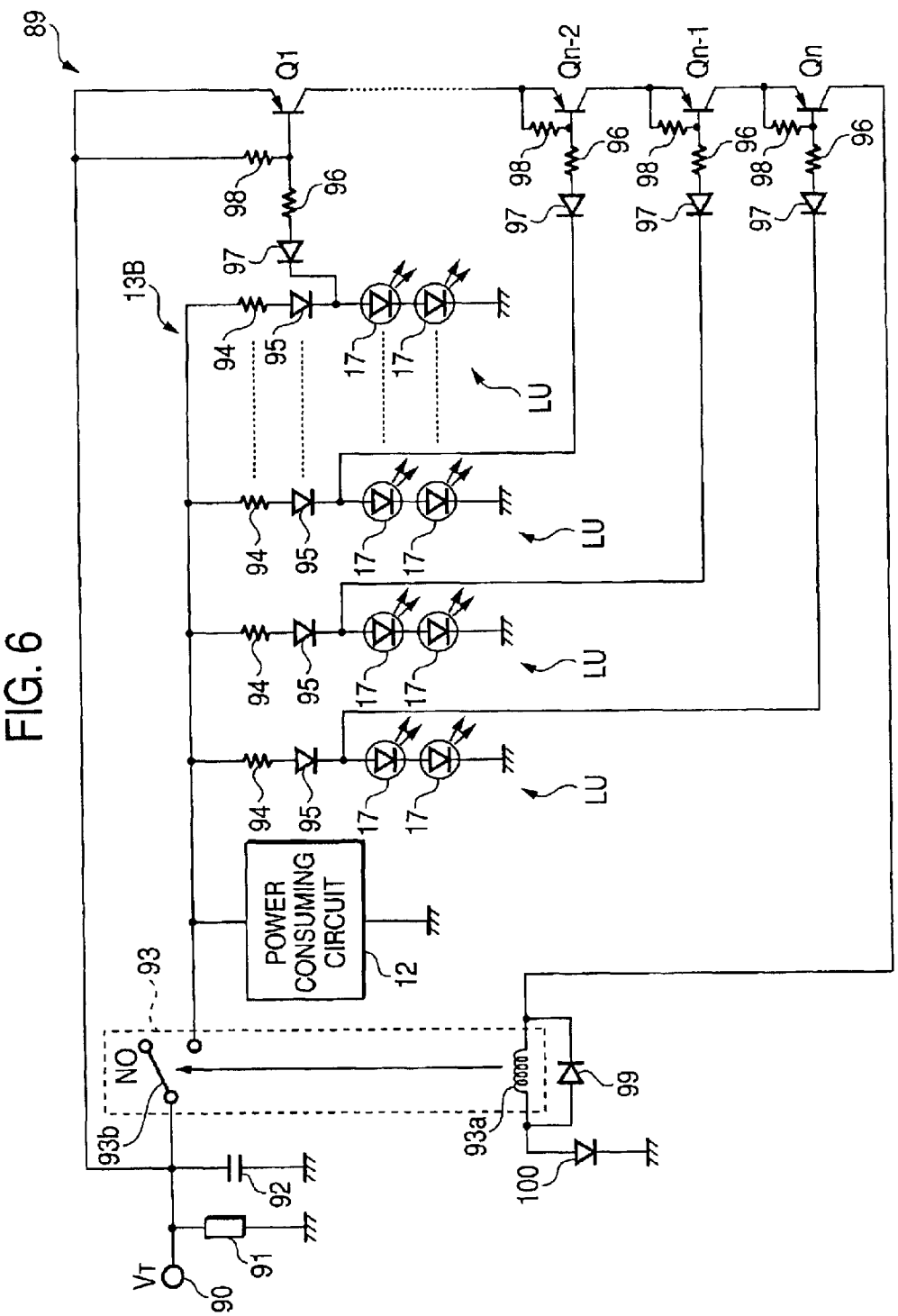
FIG. 6 is a circuit diagram showing a main part of a configuration example of the vehicle light apparatus according to the invention which enables an illumination using a reduced volume of light when a breakage of a light emitting element is detected.

For example, in the event that the light emitting element constituting the light emitting unit located in a rightmost row in FIG. 6 (the unit corresponding to the transistor Q1), since the transistor Q1 is put in the OFF state, the transistors Q2 to Qn are put in the OFF state, and the contact of the relay 93 is shifted to the NO side. Thus, in this case, not only the light emitting unit located on the rightmost row but also all the light emitting units that are located leftward of the rightmost light emitting unit are turned off.

In addition, in the event that the light emitting unit is broken which constitutes any other light emitting unit than the light emitting unit located on the rightmost row (the light emitting unit corresponding to any transistor Qi with i denoting any number other than 1), since the transistor Qi (i≠1) is put in the OFF state, the transistors Qi+1 to Qn are put in the OFF state, whereby the contact of the relay 93 is shifted to the NO side. Thus, in this case, not only the light emitting unit including the light emitting element on which the breakage was detected but also all the light emitting units located leftward of the affected light emitting unit are turned off. In FIG. 6, the luminous intensity of the light emitting unit or units located rightward of the light emitting unit on which the breakage was detected is reduced since the light emitting elements constituting the light emitting unit or units are energized. This is because since the light emitting unit corresponding to a transistor Qj (j=1, 2, . . . , i−1) is not broken, the transistor is in the ON condition, and the light emitting elements are energized via the resistors 96, 98 and the diode 97 to thereby allow current of several milliamperes to flow therethrough. Note that in this case, the flashing intervals are made to be shorter by means of the flasher circuit, not shown, so that a faster flashing can be attained (this is true with the other lamps on which no breakage is detected, and the driver is warned against the occurrence of breakage by the shorter flashing intervals).

Figure 7:
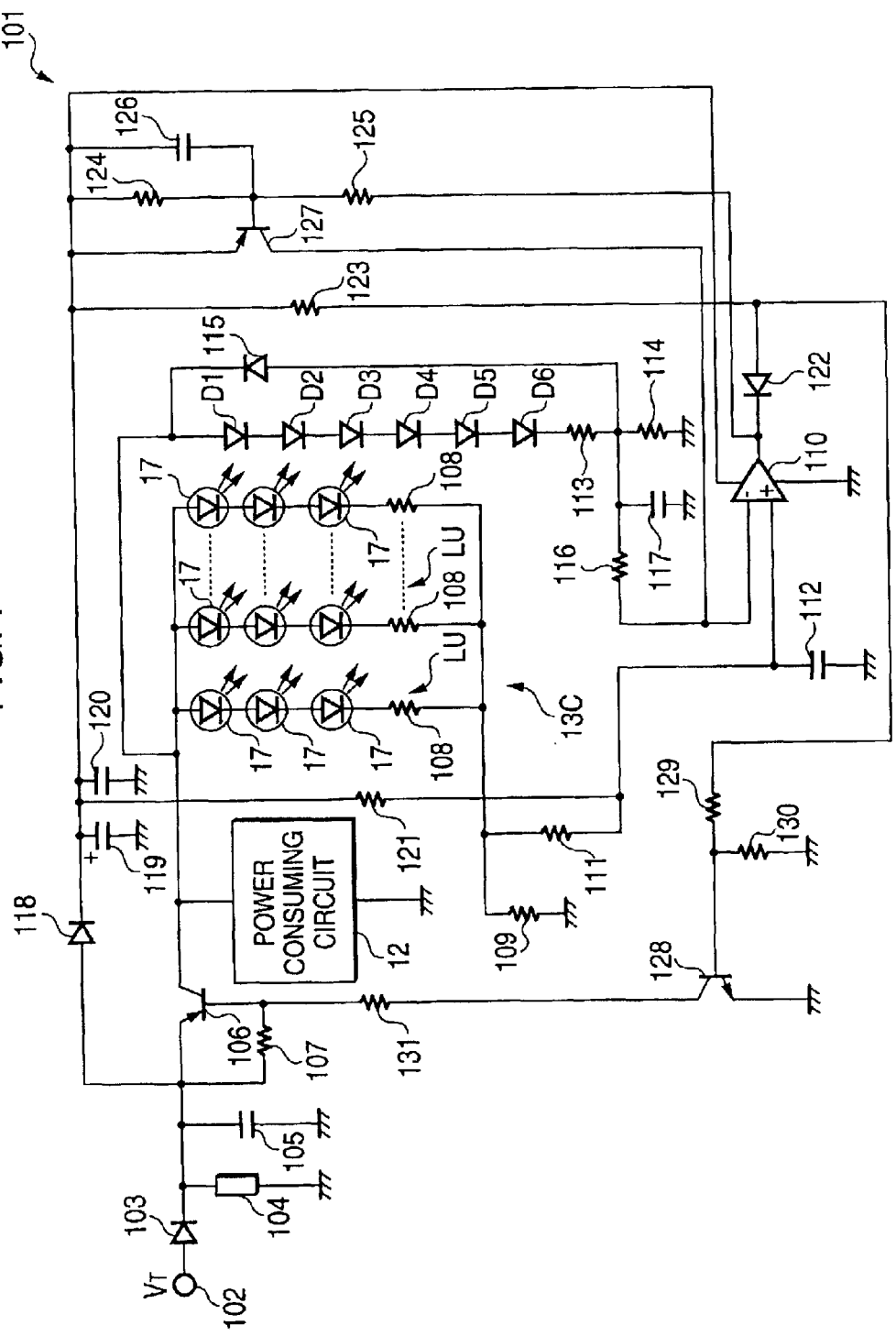
FIG. 7 is a circuit diagram showing a main part of a further configuration example of the vehicle light apparatus according to the invention.

FIG. 7 shows a circuit configuration example 101 according to the invention, and in this example, as with the configuration shown in FIG. 2, a circuit is provided for determining a breakage of a group of light emitting elements by detecting a total current that flow through the group of light emitting elements to detect a condition in which the luminous intensity of the group of light emitting elements lowers to or below a prescribed value.

A VT signal is supplied to an anode of a diode 103 from a terminal 102, and a varistor 104 and a capacitor 105 are connected to a cathode of the same diode.

A PNP transistor 106 is provided on a feeding path to a light emitting unit 13C including groups of light emitting elements, an emitter of the transistor 106 is connected to a cathode of the diode 103. Note that a resistor 107 is interposed between a base and the emitter of the transistor 106.

A power consuming circuit 12 is provided posterior to the transistor 106, and one end of the circuit is connected to a collector of the transistor 106.

The light emitting unit 13 includes as a unit construction light emitting units in each of which a current limiting resistor 108 is connected to a circuit in which a plurality of light emitting elements 17, 17, . . . are connected to each other in series. For example, as is shown in the figure, when LEDs are used as light emitting elements, a circuit in which 3 LEDs are connected in series and a resistor 108 is further connected thereto is made to constitute a light emitting unit, and a plurality of such light emitting units are connected in parallel with one another. Namely, the resistor 108 is connected to a cathode of the LED located at a most inferior position, and those resistors are then connected to one end of a current detecting resistor 109, which is grounded on the other end thereof, whereby current flowing through all the LEDs (total current) is voltage converted and detected by the resistor 109.

A positive input terminal of a comparator 110 which constitutes a breakage detecting unit is connected to one end (a terminal that is connected to the respective resistors 108) of the current detecting resistor 109 via a resistor 111, and the comparator 110 is grounded via a capacitor 112. In addition, a voltage (a reference voltage) is supplied to a negative input terminal of the comparator 111 from a circuit including diodes D1 to D6 which are connected in series, resistors 113, 114 and a diode 115. Namely, an anode of the diode D1 which is located at a most superior position is connected to a collector of a transistor 106, and a cathode of the same diode is then connected to an anode of the diode D2. Then, the diodes D2, D3, D4, D5, D6 are connected (every connection is made along a forward direction) in series in that order from the superior side, and cathode of the diode D6 is connected to one of the resistor 113. In addition, a cathode of the diode 115 is connected to the anode of the diode D1, and an anode of the diode 115 is connected to a connecting point between the resistor 113 and the resistor 114.

A terminal of the resistor 113 which is opposite to its end connected to the diode D6 is grounded via the resistor 114, and a connecting point between both the resistors 113, 114 is connected to the negative input terminal of the comparator via resistor 116 and is grounded via a capacitor 117.

Feeding of power supply to the comparator 110 is implemented from a diode 118 and capacitors 119, 120. Namely, an anode of the diode 118 is connected to a cathode of the diode 103, and a cathode of the diode 118 is grounded via the capacitors 119, 120. Then, a terminal voltage of these capacitors is supplied to a power supply voltage terminal of the comparator 110 and is also supplied via a resistor 121 to a connecting point between the resistor 111 and the capacitor 112 (for an initial operation of the comparator 110).

In addition, the reason why the plurality of diodes (D1 to D6) are used in the circuit for generating the reference voltage to the comparator 110 is because in case there occurs a variation in power supply voltage to the comparator 110, a change in input to the positive input terminal of the comparator 110 is a change incorporating the characteristics of the diodes (LEDs), and a variation in the reference potential (the potential at the negative input terminal) needs to coincide with the change. In this example, while 6 diodes (D1 to D6) are provided in series for 3 LEDs, the value on Vf (forward voltage drop) of the LEDs is substantially double the Vf value of the respective diodes D1 to D6 (therefore, in general, as to the provision of LEDs and diodes, a number of diodes doubled according to the ratio of the Vf value may be provided).

An output terminal of the comparator 110 is connected to a cathode of a diode 122, and an anode of the diode 122 is connected to a cathode of a diode 118 via a resistor 123.

As to a circuit including resistors 124, 125 and a capacitor 126, and a PN transistor 127, ends of the resistor 124 and the capacitor 126 connected in parallel with the resistor 124 are connected to the cathode of the diode 118, respectively, and the other ends of the resistor 124 and the capacitor 126 are connected to the output terminal of the comparator 110 via the resistor 125. Then, an emitter of the transistor 127 is connected to the cathode of the diode 118, and a base of the same transistor is connected to a connecting point between the resistor 124 and the resistor 125. A collector of the transistor 127 is connected to the negative input terminal of the comparator 110.

In a transistor 128 which is grounded at an emitter thereof, resistors 129, 130 are connected to a base of the transistor 128, and the base is connected to the diode 122 via the resistor 129. Note that the resistor 130 is connected at one end thereof to the base of the transistor 128 and is grounded at the other end. In addition, a collector of the transistor 128 is connected to the base of the transistor 106 via a resistor 131.

The function of the circuit according to the example will be described. Firstly, in the event that no breakage is detected on the light emitting elements constituting the light emitting unit 13C (in other words, in the event that no light emitting elements are broken at all or a less than predetermined number of light emitting elements are broken), since a current value (a value of current flowing to the groups of light emitting elements) detected by the current detecting resistor 109 is larger than a predetermined reference value, the output signal of the comparator 110 is at the H level. Consequently, the transistors 128, 106 are in the ON state, and feeding to the light emitting unit 13C is allowed to continue. In addition, in the event that a breakage is detected on the groups of light emitting elements which constitute the light emitting unit 13C (in other words, in the event that the predetermined number or larger of light emitting elements are broken), since the current value of the groups of light emitting elements that is detected by the current detecting resistor 109 becomes smaller than the predetermined reference value, the output signal of the comparator 110 is at the L level. Consequently, while the diode 122 is energized and the transistors 128, 106 are put in the OFF state, since the transistor 127 is put in the ON state by an L-level signal outputted from the comparator 110, the comparator 110 is held in the L-level output condition, whereby as a result of continuous halt of feeding to the groups of light emitting elements, the respective light emitting elements are turned off. Note that the other lamps on which no breakage is detected are caused to flash at shorter flashing intervals by an instruction from the flasher circuit, not shown, and as a result, the driver is notified of the occurrence of breakage.

While in the configuration examples of this example and shown in FIGS. 2, 5, the holding means (holding unit) is provided for stopping the feeding to the light emitting unit in the event that a breakage is detected on the light emitting elements and holding that state, there may be provided a configuration in which no such means is provided, and at the time of detecting a breakage, the light emitting elements on which no breakage is detected are caused to flash for providing a warning against the occurrence of abnormal situations.

Figure 8:
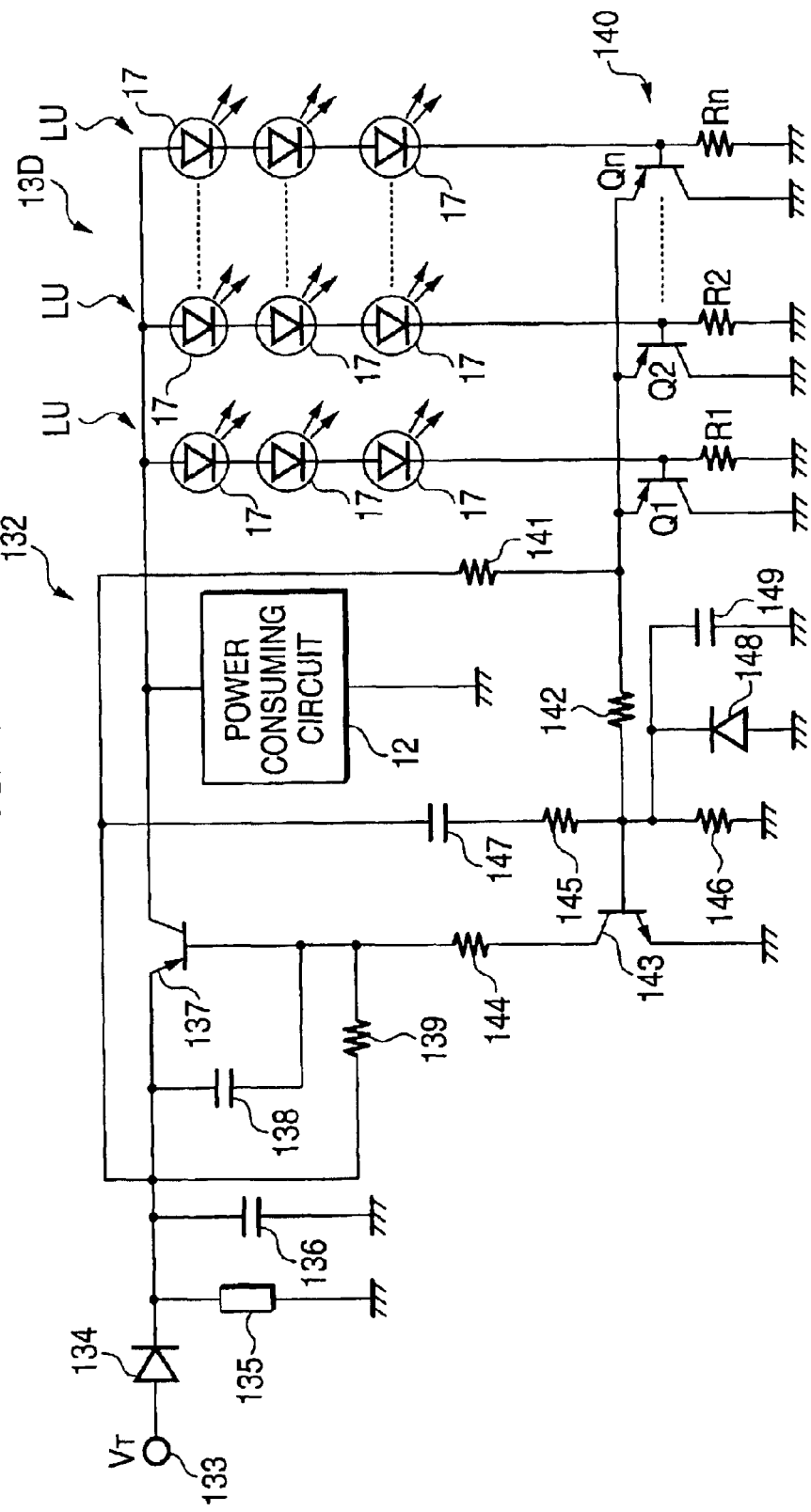
FIG. 8 is a circuit diagram showing a configuration example of the vehicle light apparatus according to the invention in which light emitting elements which are not broken are allowed to flash for providing a warning against the occurrence of an abnormal situation.

FIG. 8 shows such a circuit configuration 132, and in this example, as with the configuration shown in FIG. 5, a circuit is provided in which current is detected on each light emitting unit including a plurality of light emitting elements for determination of the occurrence of breakages.

A signal VT is supplied to an anode of a diode 134 from a terminal 133, and a varistor 135 and a capacitor 136 are connected to a cathode of the diode 134 in parallel with each other.

A PNP transistor 137 is provided on a feeding path to a light emitting unit 13D, and an emitter thereof is connected to a cathode of a diode 134. Note that a capacitor 138 and a resistor 139 are interposed between a base and the emitter of the transistor 137 in a parallel fashion.

A power consuming circuit 12 and the light emitting unit 13D are provided posterior to the transistor 137, and ends of the circuit and the unit are connected to a collector of the transistor 137.

The light emitting unit 13D includes as a unit construction light emitting units in each of which a current detecting resistor Ri (i=1, 2, ..., n) is connected to a circuit in which a plurality of light emitting elements 17, 17, ... are connected in series to each other. For example, as shown in the figure, in a case where LEDs are used as light emitting elements, raised is a configuration wherein a circuit in which 3 LEDs are connected in series to each other and a current detecting resistor Ri is further connected in series to the LEDs is made to constitute a single light emitting unit, and such light emitting units are connected in parallel with each other. Namely, the current detecting resistor Ri is connected to a cathode of the LED of those constituting each light emitting unit which LED is located at a most inferior position, and one end of the same resistor is grounded, whereby current flowing through the respective LEDs constituting each light emitting unit is voltage converted and detected by the resistor.

Note that of the LEDs constituting each light emitting unit, an anode of the LED located at a most superior position is connected to a collector of the transistor 137.

A breakage detecting unit 140 has detection circuits provided for each light emitting unit, and the configurations of the detection circuits are the same for each light emitting unit.

Namely, PNP transistors Qi (i=1, 2, ..., n) which are each grounded at collectors thereof are provided n light emitting units, respectively, and a base of each transistor is connected to a connecting point between the light emitting element 17 located at the most inferior position and the current detecting resistor Ri in each light emitting unit.

Then, an emitter of each transistor Qi is connected to the emitter of the transistor 137 via a resistor 141 and is also connected to a base of an NPN transistor 143 via a resistor 142.

A collector of the NPN transistor 143, which is grounded at an emitter thereof, is connected to the base of the transistor 137 via a resistor 144, and the base of the transistor 143 is connected to a connecting point of resistors 145, 146 and the 142. Note that one end of the resistor 145 is connected to the emitter of the PNP transistor 137 via a capacitor 147, and the other end of the resistor 145 is connected to a capacitor 149 via the resistor 146 and an diode 148 (a cathode thereof) (the other ends of the resistor 146 and the capacitor and an anode of the diode 148 are all grounded).

The function of the circuit according to the example will be described. Firstly, in the event that no breakage is detected on the light emitting elements constituting the light emitting unit 13D, since the respective transistors Qi (i=1, 2, ..., n) are in the OFF state, the transistors 143, 137 are in the ON state, whereby feeding to the light emitting unit 13D is allowed to continue. In addition, in the event that a certain light emitting element is broken and the light emitting unit incorporating the broken light emitting element is turned off, the breakage is detected by the resistor Ri and the transistor Qi (i=1, 2, ..., n). In other words, since the transistor Qi is put in the ON state, the transistors 143, 138 are temporarily put in the OFF state. Then, a detection like this is implemented every time a flash instruction period (a period representing an illumination instruction) arrives in a flash instruction given by the signal VT, and after current is momentarily conducted to the light emitting elements which are not broken so as to illuminate the elements, the transistor 137 is switched off, whereby every time this occurs, feeding to the light emitting elements is stopped every. When an abnormal condition like this is detected by a breakage detecting circuit (a known circuit in which a breakage is detected based on a reduction in current) which is incorporated in a flasher circuit (not shown) for sending out the VT signal, the flashing interval of the signal VT becomes shorter, and an instruction signal to instruct flashing at fast speed is supplied to the terminal 133. As this occurs, the resistance values of the resistors 145, 146 and the static capacitance value of the capacitor 147 are set such that an ON period of the fast-speed flashing or the length of an illumination instruction period become equal to the length of a period when the light emitting elements are temporarily illuminated (a period of momentary illumination) at the time of detecting a breakage (in the event that the length of the period when the light emitting elements are temporarily illuminated is longer than the illumination instruction period, since it is not possible to respond to an instruction of flashing at high speed, the lengths of both the periods need to be matched each other by setting a time constant).

Thus, in the event that a breakage is detected on the light emitting elements, the light emitting elements which are not broken within a lamp having the broken light emitting elements are allowed to flash at shorter flashing intervals than the flashing intervals used before the breakage was detected. In other words, in the event that a certain light emitting element is broken, the driver can be notified of the occurrence of an abnormal situation due to the breakage through the high-speed flashing condition triggered by the signal VT, and the remaining light emitting elements which are not broken are allowed to continue functioning to thereby ensure the safety on the road (only the light emitting unit or units incorporating the broken light emitting elements are turned off, and the remaining light emitting units are caused to flash at high speed, whereby even if a breakage should be detected on all the lamps, high-speed flashing can be attained by the light emitting elements constituting the light emitting units which are not broken and hence alive).

As is clear from what has been described heretofore, according to a first aspect of the invention, the circuit configuration can be commonized and the costs can be reduced by providing the power consuming means so as to make the load characteristic constant. In addition, in the event that a breakage of the light emitting element is detected, since the power supply to a lamp incorporating therein the broken light emitting element is stopped or power supplied thereto is reduced, power consumption can be reduced accordingly.

According to a second aspect of the invention, the occurrence of an abnormal situation due to a breakage can visually be recognized through a difference in flashing intervals.

According to a third aspect of the invention, even if a slight number of light emitting elements are broken, in the event that a sufficient amount of light (an amount of light which can meet the requirement by the relevant regulation) can still be obtained, no breakage is determined, whereby the illumination or flashing of the light emitting elements can continue to an extreme extent. In addition, the frequency at which erroneous detections are made can be reduced.

According to a fourth aspect of the invention, in the event that a breakage is detected on even one of the group of light emitting elements, a breakage is determined, and a needed countermeasure (such as repair) can be provided at an early timing.

According to a fifth aspect of the invention, both the notification of the occurrence of breakage and securement of the safety can be attained by allowing the light emitting elements which are not broken to continue to function.

What is claimed is:

1. A vehicle light apparatus comprising:

a plurality of lamps each including a group of light emitting elements;

power consuming means provided in parallel with an associated group of light emitting elements for causing a total power value including power consumed by each lamp to become a normal power value;

breakage detecting means for detecting a breakage with respect to the associated group of light emitting elements; and control means for controlling power supply to the associated group of light emitting elements:

wherein when an instruction signal is inputted into the lamps, the associated group of light emitting elements is caused to illuminate or flash, and when a breakage of a group of light emitting elements is detected by the breakage detecting means, a power supply to the lamp including the group of broken light emitting elements is stopped or power supplied to the lamp is reduced by the control means.

2. A vehicle light apparatus as set forth in claim 1, wherein when the breakage of the group of light emitting elements is detected by the breakage detecting means, the lamps each including a group of light emitting elements with no breakage thereof detected flash at shorter flashing intervals than flashing intervals before the breakage was detected.

3. A vehicle light apparatus as set forth in claim 2, wherein when the breakage is detected by the breakage detecting means with respect to a number of groups of light emitting elements which number is equal to or larger than a predetermined number, a power supplied to the lamps including the group of light emitting elements on which the breakage was detected is stopped.

4. A vehicle light apparatus as set forth in claim 2, wherein when a breakage is detected by the breakage detecting means on one of the groups of light emitting elements, a power supplied to the lamp including the broken light emitting element is stopped.

5. A vehicle light apparatus as set forth in claim 1, wherein when a breakage is detected by the breakage detecting means with respect to the number of groups of light emitting elements which number is equal to or larger than a predetermined number, a power suppied to the lamps including the group of light emitting elements on which the breakage was detected is stopped.

6. A vehicle light apparatus as set forth in claim 1, wherein when a breakage is detected by the breakage detecting means on one of the groups of light emitting elements, a power supplied to the lamp including the broken light emitting element is stopped.

7. A vehicle light apparatus as set forth in claim 1, wherein when a breakage of the light emitting elements is detected by the breakage detecting means, the non-broken light emitting elements in the lamp having the light emitting elements on which the breakage was detected are caused to flash at shorter flashing intervals than flashing intervals before the breakage was detected.

* * * * *